United States Patent [19]

Mullani

[11] Patent Number: 4,864,138

[45] Date of Patent: Sep. 5, 1989

[54] POSITRON EMISSION TOMOGRAPHY CAMERA

[75] Inventor: Nizar A. Mullani, Houston, Tex.

[73] Assignee: Clayton Foundation for Research, Houston, Tex.

[21] Appl. No.: 220,757

[22] Filed: Jul. 14, 1988

[51] Int. Cl.⁴ .............................................. G01T 1/164
[52] U.S. Cl. ................................ 250/363.03; 250/366; 250/367
[58] Field of Search .................... 250/363.03, 366, 367

[56] References Cited

U.S. PATENT DOCUMENTS

| | | | |
|---|---|---|---|
| 4,234,792 | 11/1980 | DeCou et al. | 250/361 R |
| 4,563,582 | 1/1986 | Mullani. | |
| 4,642,464 | 2/1987 | Mullani. | |
| 4,643,764 | 5/1988 | Casey et al. | 250/363.03 |
| 4,677,299 | 6/1987 | Wong | 250/363.03 |

FOREIGN PATENT DOCUMENTS 52-3481  1/1977  Japan .................................. 250/367
58-162883  9/1983  Japan .................................. 250/363.03

Primary Examiner—Constantine Hannaher
Attorney, Agent, or Firm—Fulbright & Jaworski

[57] ABSTRACT

A positron emission tomography camera having a plurality of detector rings positioned side-by-side around the axis of a patient area. Each detector plane includes a plurality of photomultiplier tubes with at least two rows of scintillation crystals positioned on each photomultiplier tube and extending to photomultiplier tubes in other detector planes. Each row of crystals is offset from the other rows of crystals. Each crystal has a first end of a length in the axial direction less than the size of the photomultiplier tube for increasing a slice resolution. In order to provide identification of which crystal is activated by radiation, the second ends of some of the crystals adjacent the photomultiplier tubes are shaped differently from others. in one embodiment, the scintillation crystals are made out of a crystal bar with grooves cut into the block.

7 Claims, 3 Drawing Sheets

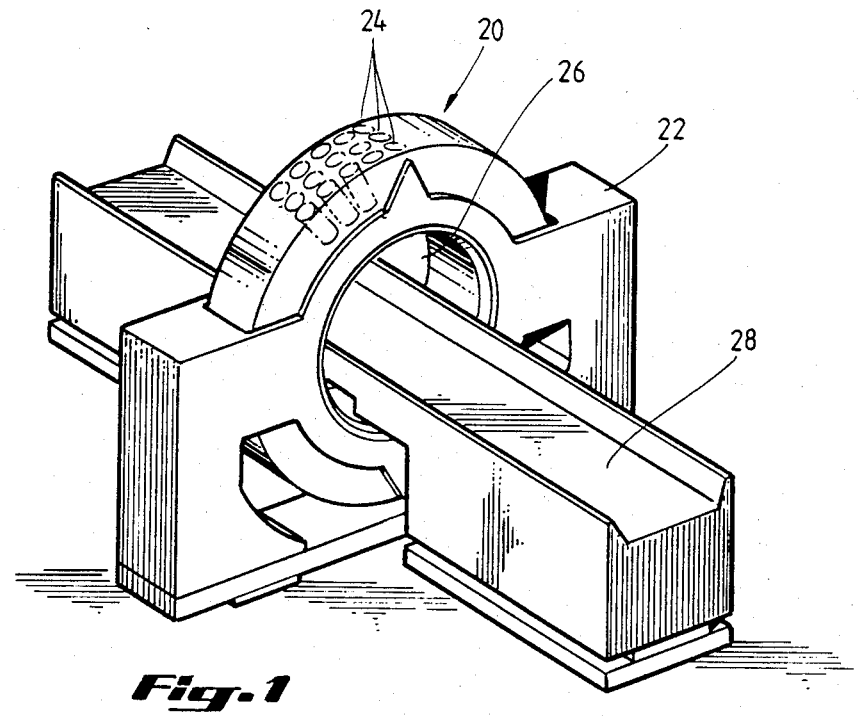
Fig. 1
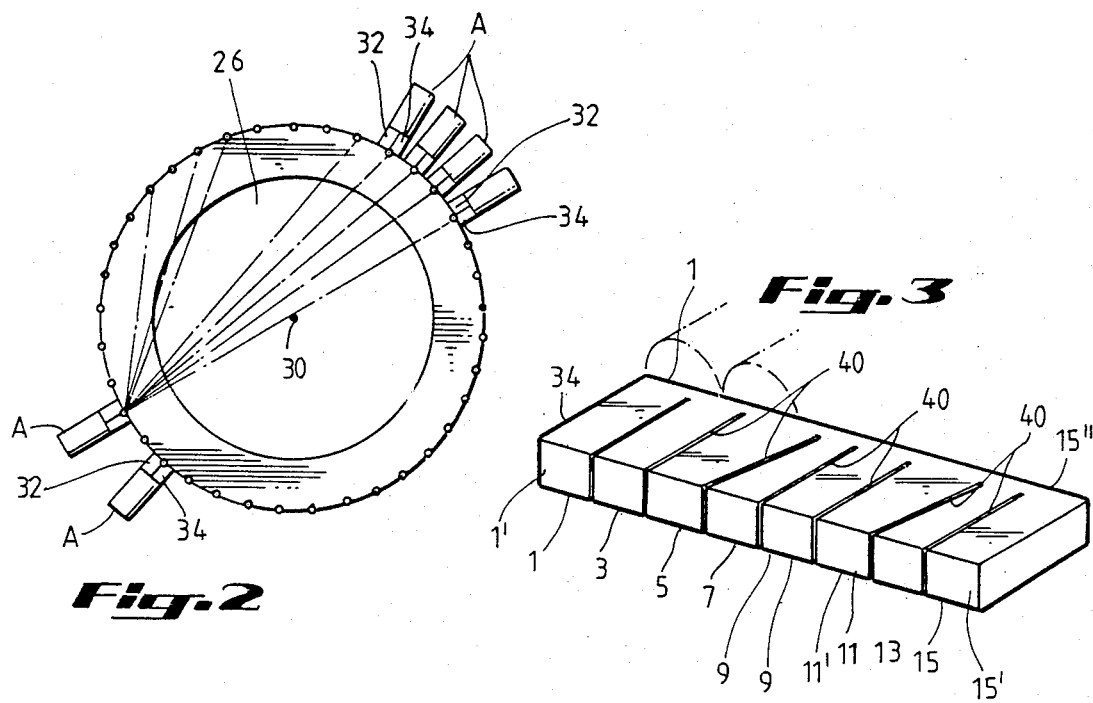
Fig. 2
Fig. 3

| CRYSTAL | IDENTIFICATION TABLE PHOTO MULTIPLIER TUBE (PMT) RELATIVE SIGNAL LEVELS | | | | | |
|---|---|---|---|---|---|---|
| | A | B | C | D | E | F |
| 1 | 1.0 | 0 | 0 | 0 | 0 | 0 |
| 2 | 0.75 | 0.25 | 0 | 0 | 0 | 0 |
| 3 | 0.50 | 0.50 | 0 | 0 | 0 | 0 |
| 4 | 0 | 1.0 | 0 | 0 | 0 | 0 |
| 5 | 0 | 0.75 | 0.25 | 0 | 0 | 0 |
| 6 | 0 | 0.50 | 0.50 | 0 | 0 | 0 |
| 7 | 0 | 0 | 1.0 | 0 | 0 | 0 |
| 8 | 0 | 0 | 0.75 | 0.25 | 0 | 0 |
| 9 | 0 | 0 | 0.50 | 0.50 | 0 | 0 |
| 10 | 0 | 0 | 0 | 1.0 | 0 | 0 |
| 11 | 0 | 0 | 0 | 0.75 | 0.25 | 0 |
| 12 | 0 | 0 | 0 | 0.50 | 0.50 | 0 |
| 13 | 0 | 0 | 0 | 0 | 1.0 | 0 |
| 14 | 0 | 0 | 0 | 0 | 0.75 | 0.25 |
| 15 | 0 | 0 | 0 | 0 | 0.50 | 0.50 |
| 16 | 0 | 0 | 0 | 0 | 0 | 1.0 |

POSITRON EMISSION TOMOGRAPHY CAMERA

BACKGROUND OF THE INVENTION

It is known, as disclosed in U.S. Pat. Nos. 4,563,582 and 4,642,464 to provide a positron emission tomography (PET) camera having a plurality of rows of scintillation crystals offset from each other on each photomultiplier tube. However, the length of crystals in the axial direction was the same as the size of the photomultiplier tube in the axial direction. Because of this length restriction on the crystals, the slice resolution of the camera was limited. In order to increase the slice resolution, a smaller crystal size in the axial direction, that is the length of the crystal, is desirable. Of course, the same configuration shown in the above named patents could be used with smaller length crystals by simultaneously using smaller size photomultiplier tubes. However, this would greatly increase the cost and complexity of the camera.

The present invention is directed to various improvements in a PET camera by increasing the axial resolution and providing more measuring slices without adding any more photomultiplier tubes.

SUMMARY

One of the features of the present invention is the provision of scintillation crystals having a length of their first ends less than the size of a photomultiplier tube thereby providing higher axial resolution and more measuring slices of the patient area without increasing the number of photomultiplier tubes.

By using crystals which have a length less than the photomultiplier tubes, the problem of crystal identification, that is, which crystal is activated by radiation, is increased. Another feature of the present invention is the provision of shaping some of the crystals different from other of the crystals in order to provide the identification of which crystal is activated.

In the preferred embodiment this difference in shape is provided by tapering the crystals from their first ends, nearer the patient area, towards their second ends, adjacent the photomultiplier tubes, whereby the area of the second ends of some of the crystals are different from others to provide the necessary identification.

Another feature of the present invention is the provision of using a bar of crystal with grooves cut in it to simplify the construction of the crystal module.

Still a further object of the present invention is the provision of a positron emission tomography camera having a plurality of detector planes positioned side-by-side around the axis of a patient area to detect radiation from the patient area wherein each detector plane includes a plurality of photomultiplier tubes. At least two rows of scintillation crystals are positioned on each photomultiplier tube and the rows extend to photomultiplier tubes in other detector planes. Each row of crystals on each photomultiplier tube are offset from the other rows of crystals. Each crystal has a first and second end in which the second ends are positioned adjacent a photomultiplier tube and the first ends face the patient area. The lengths of the first ends are less than the width of the photomultiplier tube. In addition, the lengths of some of the second ends of some of the crystals in each row are different from the lengths of the second ends of other crystals in each row for providing the identification of which crystal is activated by radiation.

Still a further object of the present invention is wherein some of the crystals are tapered from their first ends to their second ends.

Yet a still further object of the present invention is wherein each row of crystals is formed from a block in which grooves extend from the first ends toward and spaced from the second ends to form a plurality of crystals. Some of the grooves extend from the first ends at a different angle than other grooves for providing second ends of different lengths.

Still a further object is wherein the widths of the second ends of the crystals is less than the width of the first ends of the crystals to enhance the collection of light by the photomultiplier tubes.

Yet a further object is wherein the lengths of the first ends of all of the crystals is substantially equal.

Yet still a further object is wherein some of the crystals in each row are tapered from the first ends towards the second ends for providing lengths of some of the second ends of some of the crystals in each row different from the lengths of the second ends of other crystals in each row.

Other and further objects, features and advantages, will be apparent from the following description of present preferred embodiments of the invention, given for the purpose of disclosure, and taken in conjunction with the accompanying drawings.

BRIEF DESCRIPTION OF THE DRAWINGS

FIG. 1 is a perspective elevational view of the positron emission tomography camera of the present invention, FIG. 2 is a schematic cross-sectional view of the placement of one detector plane which includes a plurality of photomultiplier tubes and crystals, FIG. 3 is an enlarged perspective view of the preferred embodiment of one row of crystals of the present invention.

BRIEF DESCRIPTION OF THE PREFERRED EMBODIMENT

Figure 4:
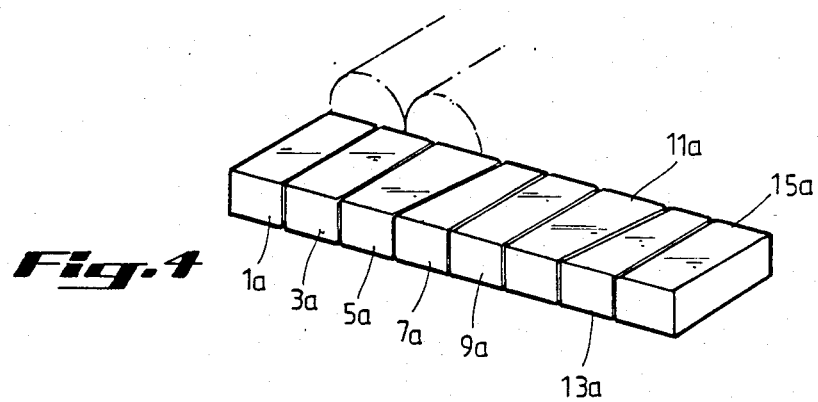
FIG. 4 is a perspective view of another embodiment of a row of separate crystals of the present invention.

Referring now to the drawings, and particularly to FIG. 1, the reference numeral 20 indicates a positron emission tomography camera having a support or gantry 22, a plurality of detector planes 24, here shown as three detector rings, merely for ease of illustration, positioned side-by-side and surrounding a patient area 26 to detect radiation therefrom. The patient area 26 may include a patient bed 28 for supporting a patient who has been injected with radiation such as rubidium-82.

Referring now to FIG. 2, a cross-section illustrating one of the detector planes 24 is shown in which a plurality of photomultipliers A are shown providing a ring of detectors around the axis 30 of the patient area 26. At least two rows 32 and 34 of scintillation crystals are positioned on each photomultiplier tube between the photomultiplier tubes and the patient area 26 for detecting radiation from a patient and then converting the detected radiation into light which is transmitted to the photomultiplier tubes for converting the detected radiation into electrical pulses.

However, as described in my U.S. Pat. No. 4,642,464, any desirable number of rows of crystals may be provided on each photomultiplier tube. In any event, the rows 32 and 34 are offset from each other and any other rows of crystals, as will be more fully described hereinafter, in order to increase the number of image planes, better data sampling, a reduction in the number of photomultiplier tubes, and a consequent reduction in cost.

In the previous designs of the previously mentioned patents, the length of the individual crystals in the axial direction, that is, parallel to the camera axis 30, were of the same size as the size of the photomultiplier tubes. One feature of the present invention is the use of crystals which have a first end of a length less than the width of the photomultiplier tubes thereby increasing the slice resolution of the camera. of course, while the slice resolution could be reduced by reducing the length of the crystals and at the same time using smaller photomultiplier tubes, this would result in a significant cost increase. One advantage of the present improvement is that existing cameras can be changed to provide higher axial resolution and more slices without adding any more photomultiplier tubes or changing the detector module size. By using crystals which have a first end of a length of less than the photomultiplier width, these advantages can be achieved. However, in order to provide identification of which crystal has been activated by radiation, some of the crystals are required to be shaped differently from others.

For purposes of illustration only, the present invention will be described in connection with a camera having six detector planes, each of which has a plurality of Photomultiplier tubes A, B, C, D, E, and F, respectively, and as best seen in FIGS. 2 and 5-9, having at least two rows 32 and 34 of scintillation crystals, such as BGO crystals, positioned on each of the photomultiplier tubes in which the rows extend to photomultiplier tubes in other detector planes. That is, the rows 32 and 34 extend across one row of photomultipliers A, B, C, D, E, and F. However, it is to be understood that various numbers of photomultiplier detector planes 24 may be provided and a various number of rows of scintillation crystals may be provided. It is to be noted that the plurality of detector planes 24 containing the photomultiplier tubes A, B, C, D, E and F, respectively, are positioned side-by-side and are perpendicular to the axis 30 of the camera 20 and that the rows of scintillation crystals 32 and 34 extend in a line substantially perpendicular to the detector planes 24 and extend in a direction parallel to the axis 30.

Row 32 includes crystals 2, 4, 6, 8, 10, 12 and 14. Row 34 includes crystals 1, 3, 5, 7, 9, 11, 13 and 15 In the particular camera configuration shown the length of the first ends of the crystals are two-thirds of the width of the photomultiplier tubes and provide eight staggered rings of crystals for the six planes of Photomultiplier tubes and provides a total of 33 slices with increased axial resolution.

Another feature of the present invention is that in order to achieve the proper identification of the crystals, some of them have to be shaped differently from others in order to provide a distinctive output signal that can be received and identified by the photomultiplier tubes.

Figure 5:
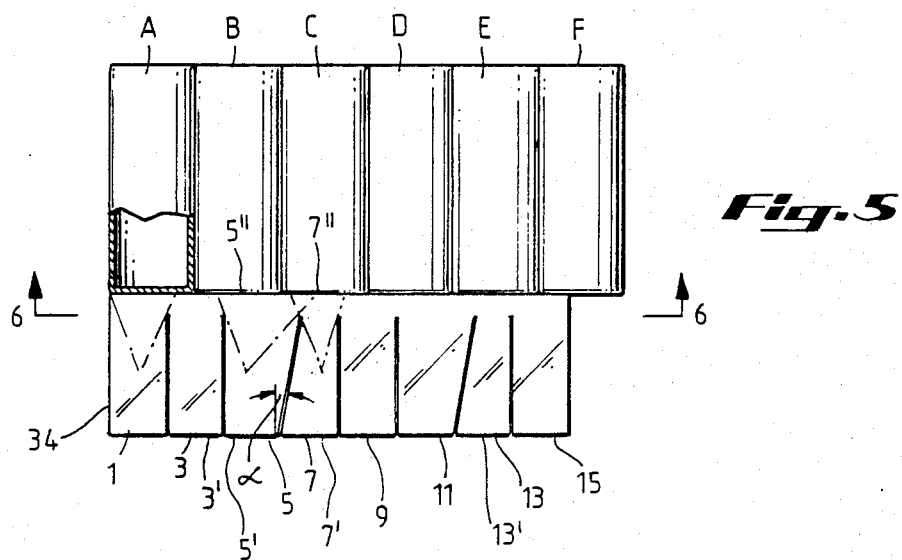
FIG. 5 is a schematic elevational view illustrating the relationship between the scintillation crystals and the photomultiplier tubes of the present invention.

Referring now to FIGS. 3 and 5, row 34 of the crystals is shown in which each crystal has a first and a second end. Crystal 1 has a first end 1' and a second end 1' The ends of the other crystals are numbered with the number of the crystal using ' for the first end and ' for the second end. The first ends 1', 3', 5', 7', 9', 11', 13', and 15' face the patient area 26 and the second ends 1', 3', 5', 7', 9', 11', 13' and 15', are positioned 0 adjacent the photomultiplier tubes. It is noted that the length of the first ends is less than the width of the photomultiplier tubes and that the length of the first ends of all of the crystals is substantially equal. However, it is to be noted that the lengths of some of the second ends of some of the crystals in each row are different from the lengths of the second ends of other crystals in each row for providing identification of which crystal is actuated by radiation. Preferably, the rows 32 and 34 of crystals is formed out of a crystal bar with grooves 40 cut in it to separate one crystal from its adjacent crystal. The grooves 40 may be tilted in some cases so that the length of the second ends of some of the crystals in each row are different.

Figure 6:
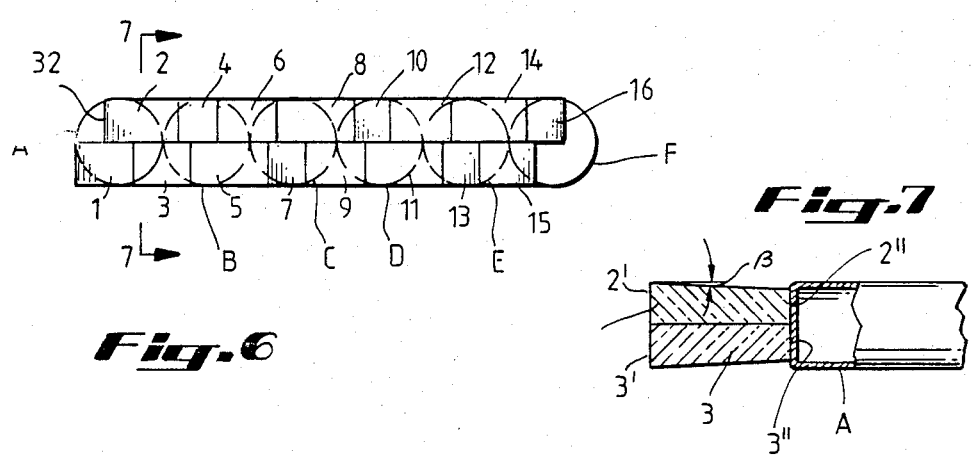
FIG. 6 is a cross-sectional view taken along the line 6—6 of FIG. 5.
Figures 8, 9:
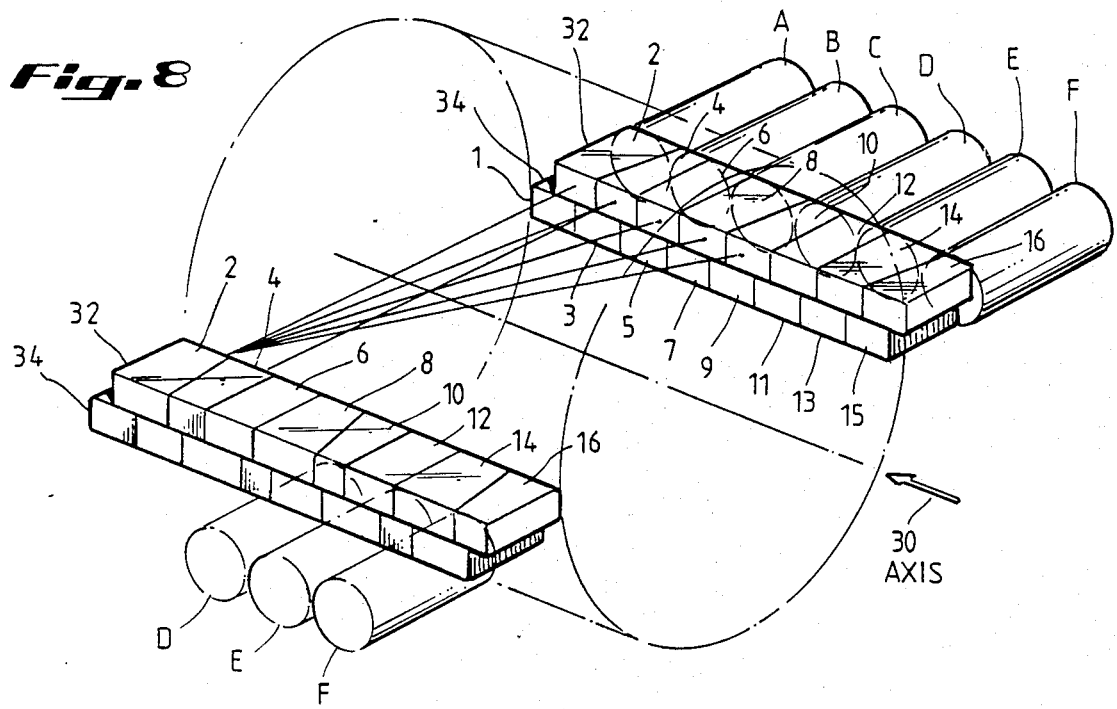
FIG. 8 is a schematic elevational perspective view illustrating two opposing sets of scintillation crystals and the photomultiplier tubes of the present invention.
FIG. 9 is a chart of an identification table illustrating how the photomultiplier tubes detect which crystal has been actuated in the embodiment illustrated in FIGS. 5-8.

Referring now to FIG. 6 and the chart of FIG. 9, FIG. 6 shows the relationship between the positioning of the second ends of all of the crystals in rows 32 and 34 relative to each of the photomultiplier tubes A, B, C, D, E and F. If all of the second ends of the crystals were identical, the photomultiplier tubes would be unable to correctly identify the activation of the crystals. In noting the position between the crystals and the photomultiplier tubes in FIG. 6 and the identification table in FIG. 9, it is noted that when crystal 1 is activated all of its light is transmitted to photomultiplier tube A thereby providing a unique identification of crystal 1. When crystal 3 is activated, it activates photomultiplier tube A and B in equal amounts to thereby provide an identification of crystal .. However, it is to be noted that the second ends 5" and 7" of crystals 5 and 7 are of unequal size caused by tilting the groove between crystals 5 and 7. That is, the interface between crystals 5 and 7 tapers from the first ends of the crystals towards the second ends of the crystals for making the lengths or areas of the second ends in each row different from other crystals for providing identification.

In row 32, it is noted that the second end of crystal 2 has been increased so as to activate tube A with a 0.75 signal and tube B with a 0.25 signal relative to a fully coupled crystal such as 1 to provide a unique identification. That is, if the second end 2' of crystal 2 were of the same length as crystal 1 than tube A could not distinguish between crystal 1 and crystal 2. Therefore, by providing grooves between adjacent crystals to place their second ends relative to the photomultiplier tubes A, B, C, D, E and F, as shown in FIG. 6 and in the identification table of FIG. 9, each of the crystals has a unique identification output signal for identifying which crystal is actuated by radiation.

Preferably as shown in FIG. 3, each row of crystal, such as 32 and 34 is preferably made out of a crystal bar with the grooves 40 cut into it as it simplifies the construction of the crystal module since all of the crystals and crystal surfaces are aligned correctly, all of the second ends are flat at the photomultiplier tubes, and the grooves 40 can be tilted or tapered to channel light easily into adjacent photomultiplier tubes for identification of the crystals. That is, as best seen in FIG. 3, the grooves 40 are cut into the crystal bar such as a BGO bar from the first ends towards, but not entirely to, the second ends of the crystals. Of course, because the grooves 40 do not extend entirely to the second end of the crystals, there may be some cross-talk due to coupling of light from one crystal to another adjacent the second ends. The amount of the cross-talk will depend upon the dimension of the grooves 40 and their angle of tilt.

Of course, if desired, the crystals may be made of individual crystals as best seen in FIG. 4 and as similarly numbered to FIG. 3 with the addition of the suffix "a".

Figure 7:
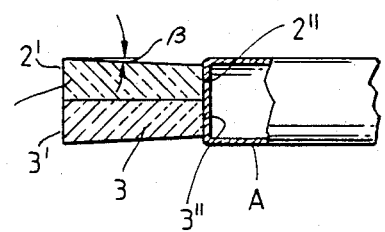
FIG. 7 is a cross-sectional view taken along the line 7—7 o FIG. 6.

Referring now to FIG. 7, it is desirable that the widths of the second ends of the crystals is less than the width of the first ends of the crystals to permit the channeling of light to the more sensitive area of the photomultiplier tubes for better light collection. For example, the crystals 2 and 3 have been tapered so that the width of ends 2" and 3" are less than the widths of the first ends 2' and 3'. Again, this feature is more easily provided for when the crystals are in form of blocks as shown in FIG. 3 instead of individual crystals as shown in FIG. 4.

Therefore, tapering selected ones of the crystals in each of the offset rows 32 and 34 makes it possible to make the lengths of the first ends of the crystals smaller in the axial direction, that is, parallel to the axis 30, to increase the slice resolution of the camera and still be able to uniquely identify each crystal.

The present invention, therefore, is well adapted to carry out the objects and obtain the ends and advantages mentioned as well as others inherent therein. While presently preferred embodiments of the invention have been given for the purpose of disclosure, numerous changes in the details of construction and arrangement of parts will readily suggest themselves to those skilled in the art and which are encompassed within the spirit of the invention and the scope of the appended claims.

What is claimed is:

1. A position emission tomography camera having a plurality of detector planes positioned side-by- side around the axis of a patient area to detect radiation from patient area comprising each detector plane including a plurality of photomultiplier tubes, at least two rows of scintillation crystals Positioned on each photomultiplier tube, said rows extending to photomultiplier tubes in other detection planes, each row of crystals on each photomultiplier tube being offset from the other rows of crystals, each crystal having a first and a second end, said second ends being positioned adjacent a photomultiplier tube and said first ends facing the patient area, the lengths of the first ends being less than the width of the photomultiplier tube, the lengths of some of the second ends of some of the crystals in each row being different from the lengths of the second ends of other crystals in each row for providing an identification of which crystal is actuated by radiation.

2. The apparatus of claim 1 wherein some of the crystals are tapered from their first ends to their second 3. The apparatus of claim 1 wherein each row of crystals is formed from a block in which a groove extends from the first ends toward but spaced from the second ends to form the plurality of crystals.

4. The apparatus of claim 3 wherein some of the grooves extend from the first ends at a different angle than other grooves for providing second ends of different lengths.

5. The apparatus of claim 1 wherein the width of the second ends of the crystal is less than the width of the first ends of the crystals.

6. A positron emission tomography camera having a Plurality of detector planes positioned side-by- side and generally perpendicular to the axis of a patient area to detect radiation from the patient area comprising, each detector plane including a plurality of photomultiplier tubes, at least two rows of scintillation crystals extending in a line substantially perpendicular to the detector planes and positioned on a photomultiplier tube in each of the detector planes, each row of crystals on each of the photomultiplier tubes being offset from the other rows of crystals on the multiplier tube, each crystal having first and second ends, said second ends being positioned adjacent a photomultiplier tube and said first ends facing the patient area, the length of the first ends being less than the width of the photomultiplier tube, some of the crystals in each row being tapered from the first ends toward the second ends for providing lengths of some of the second ends of some of the crystals in each row different from the lengths of the second ends of other crystals in each row for providing an identification of which crystal is actuated by radiation.

7. The apparatus of claim 6 wherein the lengths of the first ends of all of the crystals is substantially equal.

* * * * *

UNITED STATES PATENT OFFICE
CERTIFICATE OF CORRECTION

Patent No. 4,864,138    Dated September 5, 1989

Inventor(s) Nizar A. Mullani

It is certified that error appears in the above-identified patent and that said Letters Patent is hereby corrected as shown below:

Title page:

In the Abstract, line 14, change "in" to -- In --
Column 3, line 29, change "of" to -- Of --
Column 4, line 13, delete "1'" and insert -- 1". --
Column 4, line 14, delete the second occurrence of " ' " and insert -- " --
Column 4, line 16, delete "1'" and insert -- 1" --
Column 4, line 17, delete "3', 5', 7', 9', 11', 13' and 15'" and insert -- 3", 5", 7", 9", 11", 13" and 15" --
Column 4, line 46, delete ".." and insert -- 3. --
Column 4, line 58, delete "2'" and insert -- 2" --
Column 6, line 1, delete "Positioned" and insert -- positioned --
Column 6, line 30, delete "Plurality" and insert -- plurality --

Signed and Sealed this

Second Day of October, 1990

Attest:

HARRY F. MANBECK, JR.

*Attesting Officer*    *Commissioner of Patents and Trademarks*